United States Patent
Bujard et al.

[11] Patent Number: 5,855,660
[45] Date of Patent: Jan. 5, 1999

[54] COLORED EFFECT PIGMENTS AND THEIR USE

[75] Inventors: Patrice Bujard, Kennett Square, Pa.; Natacha Bonnard, Cheyres, Switzerland; Ryuichi Takahashi, Kita-machi, Japan

[73] Assignee: Ciba Specialty Chemicals Corporation, Tarrytown, N.Y.

[21] Appl. No.: 64,287

[22] Filed: Apr. 22, 1998

[30] Foreign Application Priority Data

Apr. 22, 1997 [CH] Switzerland .............................. 930/97

[51] Int. Cl.⁶ .................................................. C04B 14/20
[52] U.S. Cl. ...................... 106/418; 106/31.6; 106/31.9; 106/403; 106/415; 106/417
[58] Field of Search ..................... 106/403, 415, 106/417, 418, 31.6, 31.9

[56] References Cited

U.S. PATENT DOCUMENTS

| | | | |
|---|---|---|---|
| 4,668,570 | 5/1987 | Esselborn et al. | 428/324 |
| 5,026,429 | 6/1991 | Mronga et al. | 106/400 |
| 5,037,475 | 8/1991 | Chida et al. | 106/403 |
| 5,135,812 | 8/1992 | Phillips et al. | 428/403 |
| 5,246,492 | 9/1993 | Arima et al. | 106/403 |

FOREIGN PATENT DOCUMENTS

| | | |
|---|---|---|
| 0096284 | 12/1983 | European Pat. Off. . |
| 0381047 | 8/1990 | European Pat. Off. . |
| 4341162 | 6/1994 | Germany . |

OTHER PUBLICATIONS

Derwent Abst. 89–009681/02, Nov. 1989.
Derwent Abst. 90–291890/39, Sep. 1990.
Derwent Abst. 90–291891/39, Sep. 1990.
Derwent Abst. 84–220105/36, Aug. 1984.
Derwent Abst. 93–328655/42, Oct. 1993.
Derwent Abst. 88–180036/26, May 1988.
Phys.Stat. Sol. (A), vol. 140, K81, (1993).
Appl. Phys. Lett. vol. 63, (18), Nov. 1993, pp. 2511–2513.
J. Phys. Chem. vol. 99, pp. 395–401, (1995). (no month available)
U.S. Application No. 06/086,076, abandoned (Aug. 1992).

*Primary Examiner*—Mark L. Bell
*Assistant Examiner*—Scott L. Hertzog
*Attorney, Agent, or Firm*—Kevin T. Mansfield; Jacob M. Levine

[57] ABSTRACT

The invention relates to a pigment comprising
(a) a flat core and
(b) at least one coating consisting of at least two different substances that is applied to the surface of the core, wherein
    the coating (b) has a substantially continuously variable composition in the axis lying perpendicular to its surface, and
    the refractive indices of the coating (b) at the surface facing the core (a) and at the surface remote from the core (a) are different.

An outer coating (c) may additionally have been applied to the coating (b). The pigment may be embedded in a high molecular weight organic material, the refractive index of the coating (b) at its surface that is remote from the core (a) and the refractive index of the high molecular weight organic material being different. Preferred embodiments relate to specific refractive index ranges and differences. The color effect pigments according to the invention possess superior optical properties, so that an improved effect is obtained in respect of flop, goniochromaticity and saturation. The saturation (C*) in particular is astonishingly high.

21 Claims, 1 Drawing Sheet

COLORED EFFECT PIGMENTS AND THEIR USE

The present invention relates to effect pigments having a flat core and at least one coating which causes light interference and has a variable composition from the inside to the outside, so that the refractive indices at the (inner) side facing the core and at the (outer) side coming into contact with the medium into which the pigment is to be incorporated are different and bear a specific relation to the refractive indices of the above-mentioned core and of the above-mentioned medium. The invention relates also to processes for the preparation of such pigments, to substance compositions comprising such pigments and to the use of such pigments in the pigmenting of high molecular weight organic material.

Effect pigments are reflective flat particles whose reflected radiation is of varying brightness and/or has a different spectrum according to the angle relative to the flat surface. In a surface painted with effect pigments, for example, the effect pigment particles in the paint usually orient themselves substantially parallel to the surface, so that the coloured paint surface when illuminated by a fixed white light source may be of different colours according to the angle at which it is viewed and the nature of the effect pigment. A high-quality effect pigment should impart highly saturated colours to the medium in which it is incorporated at all viewing angles, and the difference in colour between a shallow and a steep viewing angle should be visually as great as possible (high goniochromaticity).

The visual difference between two colours is best reflected by the $\Delta E^*$ value in the $L^*a^*b^*$ colour system (CIELAB 1986). Different types of effect pigments are able to impart effects to varying degrees; for example, simple metal particles, for example aluminium flakes, mainly produce differences in brightness (high $\Delta L^*$), which in combination with transparent coloured pigments leads to the so-called metallic effect. If desired, the metal particles may also be combined with the transparent coloured pigments as described, for example, in U.S. Pat. No. 5,037,475 or DE 42 11 560 to form metal particles coated on the surface with coloured pigments. A coloured paint coating containing metal particles can, for example, also be combined with an additional transparent paint coating of a complementary colour and, as described in EP 0 388 931, particularly interesting effects are thus achieved.

Instead of metal particles there may also be used plate-like pigments, for example bismuth oxychlorides (®MEARLITE products, The Mearl Corp.) or the coloured β-copper phthalocyanine pigments disclosed in DE 33 06 400. In that case too, the colours reflected at various angles differ primarily in their brightness ($L^*$).

Moreover, it is also possible to use effect pigments whose colour is produced by interference. Such pigments are particles that have been coated with a thin layer of a colourless or coloured substance; the colour effect depends on the thickness of the coating layer and may manifest itself both in the brightness ($L^*$) and in the hue ($H^*$). The goniochromaticity arises because the optical path length of the reflected beam through the layer is different at different angles to the surface, and the phases of the beams reflected at the core and at the surface are thus different.

Interference pigments can be prepared from any known plate-like particles, for example from plate-like organic or inorganic coloured pigments, such as β-copper phthalocyanine, 3,4,9,10-perylenetetracarboxylic acid diimides, fluororubins or α-$Fe_2O_3$, from metal flakes, such as aluminium, copper or bronze flakes, or from mica particles. Thin layers are applied thereto, which may consist, for example, of Prussian blue or, especially, of metal oxides, such as $TiO_2$, $Fe_2O_3$, $Cr_2O_3$ or mixed-metal oxides. Such pigments are very well known to the person skilled in the art, for example from DE 32 07 936, EP 0 096 284 or U.S. Pat. No. 5,026,429. Of particular importance industrially are micas, which are coated with colourless metal oxides and additionally, if desired, with coloured metal oxides. The latter products and their use as effect pigments are described, for example, in EP 0 298 604, EP 0 388 932 and EP 0 402 943.

Finally, from EP 0 381 047 it is also known that plate-like organic coloured pigments whose refractive indices are markedly less than 2 can be coated with inorganic oxides whose refractive indices are greater than 2 for the purpose of increasing light reflectance. Oxides having refractive indices between 2.4 (anatase, magnetite, $ZrO_2$) and 2.8 ($Fe_2O_3$) are mentioned as examples. If the layer thickness is greater than about 35 nm, then the usual play of colours based on interference phenomena occurs.

Uniformly coloured coatings can be achieved, for example, by sublimation of an organic pigment onto anodised aluminium (JP Kokai Sho 63-118098) or by the simultaneous vapour deposition of a sublimable colourant and a colourless dielectric onto glass (DE 43 41 162), in the latter case the colourant in aggregated form and the dielectric being vapour-deposited alternately layer by layer, so that the colourant is intercalated in the dielectric and high mechanical stability is obtained. However, such coatings exhibit virtually no colour effect dependent on the viewing angle, even with a large number of superposed layers.

Coatings of variable composition on colourless glass are known, for example, from Phys. Stat. Sol. (A) 140, K81 (1993), it being possible to customise the optical properties. Several layers may be arranged one on top of the other, so that a coating having a periodically changing refractive index is formed. Such coatings are suitable as optical filters, a large number of periods being desired so that the orthogonal reflection band becomes as narrow as possible.

However, the demands made of pigments are constantly increasing, so that the conventional effect pigments are unable fully to meet today's high expectations, particularly in high-quality applications such as automotive lacquers. For example, many organic coloured pigments which would be desirable from the point of view of hue often exhibit inadequate light, weather or migration resistance in effect pigments, and in the case of interference pigments the saturation ($C^*$) is unsatisfactory especially in the case of shallow viewing angles.

Very surprisingly it has now been possible, thanks to the special coating described below, to obtain effect pigments that meet today's requirements to an especially high degree even in high-quality applications. The colour effect pigments according to the invention possess superior optical properties, so that an improved effect is obtained in respect of flop, reflectivity, goniochromaticity and saturation. The saturation ($C^*$) in particular is astonishingly high.

The effect pigments according to the invention are distinguished by the fact that they have a coating of variable composition. In addition, the refractive indices of the two surfaces of the coating as well as the relationship of those refractive indices to one another, to the surface of the core and, where appropriate, to the refractive index of the medium in which the pigments are being incorporated, play a part in preferred embodiments.

The invention relates to a pigment comprising
(a) a flat core and
(b) at least one coating consisting of at least two different substances that is applied to the surface of the core, wherein
   the coating (b) has a substantially continuously variable composition in the axis lying perpendicular to its surface, and
   the refractive indices of the coating (b) at the surface facing the core (a) and at the surface remote from the core (a) are different.

An outer coating (c) may additionally have been applied to the coating (b).

Accordingly, the invention relates also to a pigment comprising
(a) a flat core,
(b) at least one coating consisting of at least two different substances that is applied to the surface of the core, and
(c) an outer coating applied to the coating (b), wherein
   the coating (b) has a substantially continuously variable composition in the axis lying perpendicular to its surface, and
   the refractive indices of the coating (b) at the surface facing the core (a) and at the surface remote from the core (a) are different.

The coating of variable composition has two surfaces, of which one is in contact with the core and the other is in contact with an outer coating or is in direct contact with an external medium. The external medium may be, for example, air when the coated pigment is still being stored in the packaging, or preferably it may be a high molecular weight organic material for the pigmenting of which the coated pigments according to the invention are generally especially suitable.

The coating of variable composition consists of at least two different substances, and the refractive index is different at the two surfaces of the coating. Advantageously, at least two of the coating substances have different refractive indices, so that varying the composition produces a variation in the refractive index. The difference in refractive index between the two surfaces of the coating of variable composition is advantageously at least 0.20, for example from 0.20 to 2.00, preferably from 0.30 to 1.50, especially from 0.8 to 1.20. It is possible for either of the two surfaces to have the higher refraction.

The composition of the coating (b) is substantially continuously variable in the axis lying perpendicular to its surface. This is to be understood as meaning that the composition of the coating (b) from the surface facing the core (a) to the surface remote from the core (a) either changes continuously or, where appropriate, changes stepwise, in small steps, the composition changing only slightly between two adjacent stages so that the difference in refractive index between two adjacent stages does not cause a significant refraction of light. If the concentration changes stepwise, the difference in refractive index between any two adjacent stages is preferably no greater than 0.30, especially no greater than 0.20, more especially no greater than 0.10.

The linear shape of the concentration gradient [i.e. the progress of the curve of the composition] within the coating (b) is essentially unimportant, but the change in concentration within the coating (b) must not be too abrupt. A regular, continuous or stepwise change in the concentration is preferred for practical reasons. The region of the concentration gradient may extend from surface to surface or, preferably, it may be embedded between two uniform surface regions which are advantageously at a distance of at least 60 nm from each other. If the concentration gradient is not constant, it should preferably not exceed the value that would correspond to a notional linear change in the concentration over a layer thickness of 60 nm.

Between the side of the coating (b) remote from the core (a) and the external medium surrounding the pigment according to the invention there is advantageously likewise a difference in refractive index, the absolute value of which is to be at least 0.05, but preferably at least 0.20. That difference in refractive index is especially at least 0.30, more especially at least 0.50.

Since pigments are in general ultimately incorporated into a high molecular weight organic material for the purpose of pigmenting it, the refractive index of a high molecular weight organic material is always to be taken into account as the external medium. If it is known in which high molecular weight organic material the pigment according to the invention is to be used, the refractive index of that high molecular weight organic material is taken into account. If the pigment is intended for use in various polymers, as is entirely usual, then the middle value between the extreme values of the refractive indices of those polymers is chosen. If the field of use is difficult to predict or even completely unknown, then a value of 1.52 is simply assumed for the external medium, that value corresponding to the middle value of customary high molecular weight organic materials whose refractive indices range from 1.33 to 1.71 (J. C. Seferis, Polymer Handbook, $3^{rd}$ edition, page VI/451, J. Wiley & Sons, New York 1989).

At the boundary between the surface of the core and the surface of the coating (b) applied to the core that faces the core there is advantageously likewise a difference in refractive index, the absolute value of which is to be at least 0.05, but preferably at least 0.20. Moreover, it has been found that the differences in refractive index between the surface of the coating (b) that is remote from the core (a) and the external medium and between the surface of the coating (b) that faces the core (a) and the surface of the core should advantageously be coordinated with one another. Particularly preferably, both the difference in refractive index between the surface of the coating (b) that is remote from the core (a) and the high molecular weight organic material (d) in which the pigment according to the invention is embedded, and the difference in refractive index between the surface of the coating (b) that faces the core (a) and the surface of the core have absolute values of from 0.30 to 1.50, and the values of the respective refractive indices of those four surfaces may be in any sequence relative to one another. It is especially preferable for the absolute values of the two differences in refractive index to be approximately equal, which is understood as meaning especially a difference of from 0.00 to 0.50.

For the purpose of the invention, the refractive index $n_D$ for the sodium D line (589.3 nm), which is to be found, for example, in the above-mentioned tabular work or is indicated by the manufacturer, is sufficient in the case of a colourless material, for example a high molecular weight organic material or a colourless metal oxide, the average value applying to optically anisotropic materials.

If, by contrast, a material is coloured, then the refractive index relates to the middle value in the case of the principal absorption bands in the visible range according to the equation $$\overline{n_{PEAK}} = \frac{1}{\lambda_2 - \lambda_1} \int_{\lambda_1}^{\lambda_2} n_\lambda \partial\lambda \qquad (I)$$

wherein $\overline{n_{PEAK}}$ is the refractive index relevant to the invention; $n_{80}$ is the refractive index at wavelength $\lambda$; and $\lambda_1$ and $\lambda_2$ are the two wavelengths that belong to the absorption band of the highest absorption maximum in the visible range and themselves lie in the visible range, between which the absorption [$A=-\log(I/I_0)$] is more than half the absorption at the visible absorption maximum $\lambda_{max}$. In practice it is not necessary to resolve equation (I); in general, the approximation according to the simpler equation $$\overline{n_{PEAK}} = \frac{n_{\lambda_1} + n_{\lambda_2} + 2n_{\lambda_{max}}}{4} \qquad (II)$$

is sufficient, for which purpose the refractive indices need be determined at only 3 wavelengths.

For the determination of the refractive index, only the visible range of from 400 to 800 nm is critical, that is to say $\lambda_1$, $\lambda_2$ and $\lambda_{max}$ should be only values of from 400 to 800 nm; any absorptions in the ultra-violet or infra-red range are in any case to be disregarded in the determination of $\overline{n_{PEAK}}$.

If the surface of the core consists of a coloured pigment, it preferably has a refractive index of from 1.20 to 1.80 at 800 nm, the absolute difference between the refractive index of the surface of the core at 400 nm and the refractive index of the surface of the coating (b) applied to the core that faces the core being especially preferably from 0.00 to 0.50.

In the present invention, all refraction data always relate to values at room temperature (25° C.). Since the temperature dependency in the range of from 0° to 100° C. can generally be disregarded for the purposes of the invention, the refractive index of colourless materials can generally simply be taken from tabular works. If the refractive index for a colourless material is not known, it can be determined, for example, using an Abbé refractometer or can be calculated with the aid of the Lorentz-Lorentz and Gladstone-Dale equations. If the absorption spectrum and refractive index of the surface of a composite core are to be determined, the determination is expediently carried out not on the covered core itself, but separately on the pure covering material.

The refractive index of a coloured material can be determined by means of ellipsometry, for example in accordance with the methods disclosed by R. M. A. Azzam and N. M. Bashara [Ellipsometry and Polarized Light, North Holland Press, Amsterdam and New York (1977)] or Harland G. Tompkins [A User's Guide to Ellipsometry, Academic Press, Boston (1993)].

The refractive indices of the materials composing the coating of variable composition can be determined using the same methods. If one or both of the surfaces of the coating of variable composition comprises a mixture of several substances, it is generally sufficient to carry out a simple interpolation by percentages by volume of the components of the mixture instead of a precise determination of the refractive index of the mixture.

According to the function to be performed by the outer coating (c), it may consist of various materials. For example, (c) may consist of an at least partially reflective metal, for example of Ag, Al, Au, Cu, Cr, Ge, Mo, Ni, Si, Ti or their alloys.

However, the outer coating (c) may also consist of, for example, a dielectric material of any kind, the specific electrical resistance of which according to the customary definition is at least $10^{10}$ Ω·cm.

Where appropriate, the outer coating (c) preferably consists of a metal oxide or metal fluoride, for example of $TiO_2$, $ZrO_2$, SiO, $SiO_2$, $SnO_2$, $GeO_2$, ZnO, $Al_2O_3$, $V_2O_5$, $Fe_2O_3$, $Cr_2O_3$, MgO, $MgF_2$, CuO or $PbTiO_3$, or a mixture thereof. Special preference is given to those metal oxides which are neither dissolved nor etched by inert liquids used as solvents in many applications. The outer coating (c) preferably has a refractive index that is as different as possible from that of the coating (b) on its surface remote from the core (a) and yet as similar as possible to that of the external medium (d) in which the pigment may be embedded. Particularly preferably, the outer coating (c) has a refractive index of from 1.33 to 1.71.

The outer coating (c) may protect the underlying coatings from chemical or mechanical influences. It may, however, also reflect part of the incident light, or refract the incident light and the light reflected by the core. The person skilled in the art will know which material is suitable for which function. Moreover, the outer coating (c) is expediently not to impair the colourative properties of the coating system according to the invention located beneath it, but is to retain them as far as possible or even improve them. Accordingly, the thickness of the outer coating (c) is preferably no greater than 50 nm, especially no greater than 20 nm.

The flat core is preferably plate-like with a length of from 3 to 200 μm, a width of from 3 to 200 μm and a thickness of from 0.1 to 5 μm, especially with a length of from 5 to 100 μm, a width of from 5 to 100 μm and a thickness of up to 2 μm. The core is composed of known particles or of particles that can be prepared from known substances by known processes.

With the effect pigments according to the invention, the desired, surprising effect is obtained irrespective of the type of material of which the flat core is composed. For example, suitable materials for the core are all those mentioned in connection with the above-mentioned known types of effect pigment, such as reflective metal flakes, coloured metallic-effect pigments, flat organic pigment particles or mineral platelets, for example mica particles, which may be coated if desired. The core may be colourless or coloured and may consist of a single substance or of a combination of substances. In particular, the core may be composed of a flat inner core of any kind and one or more covering layers applied thereto, the latter consisting especially of inorganic substances, metals or coloured pigment particles. For example, a composite core may be a mica having a dielectric layer from 10 to 300 nm thick, especially having a layer of $TiO_2$ or $MgF_2$ from 10 to 30 nm thick.

The core is preferably composed of an inner core and one or more covering layers applied thereto, the surface layer consisting of an inorganic substance or of an organic coloured pigment. Both in the case of composite cores and in the case of homogeneous cores, suitable core surface materials are especially substances whose refractive indices $n_D$ or $\overline{n_{PEAK}}$ are 1.80 and above. In the case of pigments it is to be noted that known refractive indices are often values at 589.3 nm, which may differ greatly from the above-defined refractive index in the region of the visible absorption maximum ($\overline{n_{PEAK}}$) which is the only refractive index of relevance for the present invention.

There may also be used as cores particles which are prepared by coating a large area of a film-like material with one or more layers of the materials forming the core and then peeling off the coating and comminuting it to the desired particle size, as described, for example, in U.S. Pat. No. 5,135,812.

The components of the coating of variable composition, of which there are at least two, are preferably metal oxides or metal fluorides, for example $TiO_2$, $ZrO_2$, $SiO$, $SiO_2$, $SnO_2$, $GeO_2$, $ZnO$, $Al_2O_3$, $V_2O_5$, $Fe_2O_3$, $Cr_2O_3$, $MgO$, $MgF_2$, $CuO$ and $PbTiO_3$, or their water-containing forms. The metal oxides may be in the form of any crystal modifications, for example titanium dioxide may be in the form of anatase or rutile.

The layer thickness of the coating of variable composition (b) is dependent on the desired reflection colour of the effect pigment, irrespective of the absorption colour of the coloured pigment which may be present on the surface of the core, and is preferably from 60 to 1000 nm, especially at least 100 nm and more especially from 100 to 500 nm. As the layer thickness increases, the reflection colour in a fixed direction changes from yellow through red and blue to green. If the layer thickness exceeds 200 to 500 nm, according to the refractive index, then a particular colour can appear at more than one viewing angle, which is generally an undesirable effect. As the refractive index increases, the suitable maximum layer thickness decreases.

Both surfaces of the core are preferably coated with a coating of variable composition (b).

The coating consisting of at least two different substances that is applied to the surface of the core can be applied by processes that are known in principle, for example by cathodic sputtering, chemical vapour deposition or sol-gel techniques. Such methods are described, for example, in Appl. Phys. Lett. $63^{(18)}$, 2511–2513 (1993), J. Phys. Chem. 99, 395–401 (1995) or in the publications mentioned in the introduction, for example EP 0 096 284, EP 0 381 047, DE 43 41 162 or Phys. Stat. Sol. (A) 140, K81 (1993), and in the further publications mentioned therein. The coating is preferably carried out by cathodic sputtering or chemical vapour deposition (CVD). Hereinafter, the expressions "vapour", "gas" and "vapour deposition" have been chosen for the purpose of greater simplicity, but they always refer to all processes, i.e. they include by analogy, for example, also plasma or reaction mixtures.

Coatings of variable composition can be prepared by the same methods as homogeneous coatings, the only difference as compared with the homogeneous coating being, however, that in the case of the variable coating the relative concentration of the starting materials required to form the coating is changed in the course of the coating operation. That may be achieved in a very simple manner; for example, in a discontinuous process the starting material for the substance to be deposited last is added only during the coating operation, or in a continuous process the flat core passes during the coating operation from a first zone in which the starting materials are in a certain ratio, where appropriate via one or more intermediate zones, to a final zone in which the starting materials are in a different ratio.

That technique is preferably carried out as follows: in the vapour deposition process, the flat core to be coated is conveyed along a linear or circular route past at least two vapour sources, the emergent gas mixtures of which have different substance compositions. Advantageously, the two vapour sources are to be at such a distance from one another and from the flat cores that the two gas clouds partly overlap in the region of the flat cores to be coated. Particularly preferably, a large number of flat cores to be coated are moved past two fixed vapour sources, for example on a fluidised bed that is flowing past. FIG. 1 shows by way of example, to which the invention is not limited, such an arrangement in diagrammatic form. The person skilled in the art will readily recognise many other equivalent possible methods of performing the same function in an equivalent manner, such as, for example, chemical vapour deposition in a fluidised-bed process or coating a large area of a film-like material and then peeling off the coating and comminuting it to the desired particle size analogously to U.S. Pat. No. 5,135,812.

Figure 1:
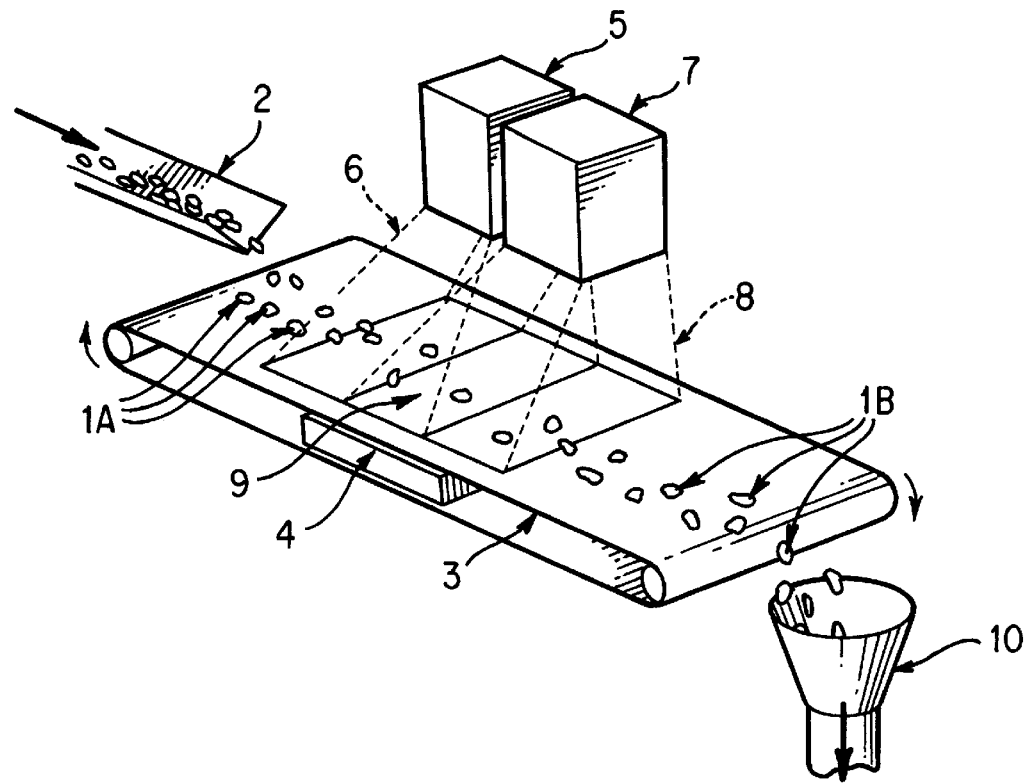
FIG. 1 depicts a continuous method of applying a coating having a continuously varying composition on the flat core particles.

In the arrangement of FIG. 1, the core particles [1A] pass from the metering device [2] onto a conveyor belt [3] which in the vapour-deposition area is in contact with a vibrator [4], during which time they are exposed to the gas mixtures [7] and [8] of different compositions produced from two vapour sources [5] and [6], which mixtures partly overlap in the region [9]. The particles [1B] provided with a coating of variable composition are then removed from the vapour-deposition area by the removal device [10].

The vapour-deposition conditions (pressure, temperature, starting materials, cathode potential, etc.) are known per se. The compositions of the gas mixtures emerging from the first and second vapour sources are to be so selected that the first vapour source produces a coating having the desired refractive index for the boundary with the core and the second vapour source produces a coating having the desired refractive index for the boundary with the surroundings. When the flat core to be coated which is being conveyed past approaches the first vapour source [5], coating begins with only the mixture of substances from that first vapour source, so that the refractive index at the inner boundary between the flat core and the coating corresponds to that of a coating produced only from that first vapour source. As the flat core to be coated moves into the region in which the two vapour sources overlap [9], the composition of the coating changes continuously from the composition of the coating produced from the first vapour source to the composition of the coating produced from the second vapour source. When the flat core to be coated passes into the region close to the second vapour source [6], the composition of the coating then corresponds to that of a coating produced from only the second vapour source. Where there are more than two vapour sources, the procedures are in principle completely analogous.

Figure 2:
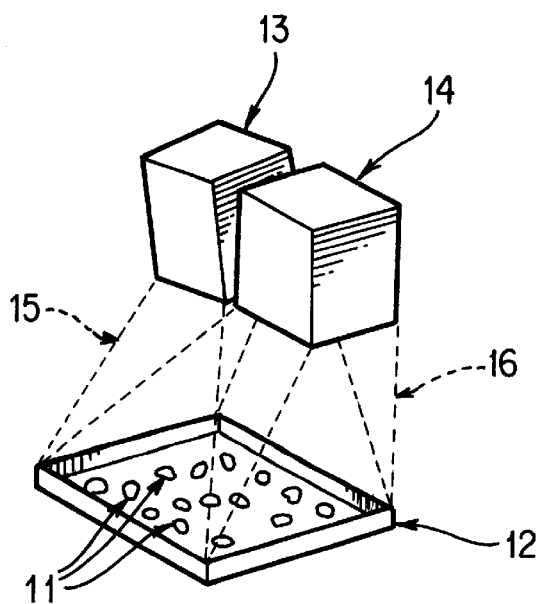
FIG. 2 depicts a batch method of applying a coating having a continuously varying composition on the flat core particles.

The vapour-deposition conditions may be controlled, for example, in terms of time and/or in terms of energy. The required vapour-deposition energy can be supplied continuously or in pulses. For example, in a stationary process as shown diagrammatically in FIG. 2, a large amount of flat core particles [11] on a container [12] can be vapour-coated with the gas mixtures [15] and [16] of different compositions produced from two vapour sources [13] and [14], the target areas of which mixtures overlap completely, the number of energy pulses reaching the vapour sources [13] and [14] being changed continuously in a time-controlled manner, for example, from an initial ratio of 2:8 to a final ratio of 7:3. The result is a coating of variable composition as in the continuous process of FIG. 1.

The pigment according to the invention can be embedded with excellent results in any high molecular weight organic material (d) for the pigmenting thereof. Such high molecular weight organic materials are described hereinafter. The amount of high molecular weight organic material (d) may be as desired and is, for example, from $10^{-4}$ to $10^4$ parts by weight, preferably from $10^{-3}$ to $10^3$ parts by weight, based on 1 part by weight of pigment {(a)+(b)} or {(a)+(b)+(c)} according to the invention. The substance compositions according to the invention may comprise other customary constituents, for example wetting agents or texture-improving agents, the amount of which may be as desired, but is preferably from 0 to 30% by weight in total, based on the total weight of the substance composition.

The pigment {(a)+(b)} or {(a)+(b)+(c)} according to the invention is embedded in the high molecular weight organic material (d), for example, by mixing or dispersing, if desired in the presence of a suitable inert liquid which can be removed again once the dispersion is complete. If desired, stirrers or roller mills or any other customary mixing devices may be used as dispersing devices for that purpose.

Examples of inert liquids are water or customary organic solvents, for example ethers, alcohols, ketones, nitriles, nitro compounds, unsubstituted or substituted aliphatic or aromatic hydrocarbons, or mixtures thereof. If desired, a cationic, anionic, zwitterionic or non-ionic wetting agent of any kind may be added to the dispersion mixture. The substance compositions according to the invention can be isolated from the dispersion mixture, for example, by filtration or concentration by evaporation of the inert liquid.

The high molecular weight organic material for the pigmenting of which the pigments or substance compositions according to the invention may be used may be of natural or synthetic origin. It may involve, for example, natural resins, drying oils, rubber or casein, or natural substances modified thereby, such as chlorine rubber, oil-modified alkyd resins, viscose, and cellulose ethers or esters, such as ethyl cellulose, cellulose acetate, cellulose propionate, cellulose acetobutyrate or nitrocellulose, but especially fully synthetic organic polymers (duroplastics and thermoplastics), as are obtained by polymerisation, polycondensation or polyaddition. From the class of the polymerisation resins there may be mentioned especially polyolefins, such as polyethylene, polypropylene or polyisobutylene, also substituted polyolefins, such as polymers of vinyl chloride, vinyl acetate, styrene, acrylonitrile, acrylic acid or methacrylic acid esters or butadiene, and copolymers of the mentioned monomers, such as, especially, ABS or EVA.

Of the group of the polyaddition resins and polycondensation resins there may be mentioned the condensation products of formaldehyde with phenols, the so-called phenol plastics, and the condensation products of formaldehyde with urea, thiourea and melamine, the so-called aminoplastic resins, the polyesters used as surface-coating resins, and both saturated, for example alkyd resins, and unsaturated, for example maleic resins, also linear polyesters and polyamides, polyurethanes or silicones.

The mentioned high molecular weight compounds may be present individually or in mixtures, in the form of plastic masses or melts. They may also be in the form of their monomers or in the polymerised state in dissolved form as film formers or binders for paints or printing inks, for example boiled linseed oil, nitrocellulose, alkyd resins, melamine resins and urea-formaldehyde resins or acrylic resins.

Depending on the intended application, it proves advantageous to use the effect pigments or effect pigment compositions according to the invention as toners or in the form of preparations. Depending on the conditioning process or intended application, it may be advantageous to add specific amounts of texture-improving agents to the effect pigment before or after the conditioning process, provided that such agents do not have an adverse effect when the effect pigments are used in the dyeing of high molecular weight organic materials, especially polyethylene. There come into consideration as such agents especially fatty acids having at least 18 carbon atoms, for example stearic acid or behenic acid, or their amides or metal salts, especially magnesium salts, as well as plasticisers, waxes, resin acids, such as abietic acid, colophonium soap, alkylphenols or aliphatic alcohols, such as stearyl alcohol or aliphatic 1,2-dihydroxy compounds having from 8 to 22 carbon atoms, such as 1,2-dodecanediol, also modified colophonium maleic resins or fumaric acid colophonium resins. The texture-improving agents are preferably added in amounts of from 0.1 to 30% by weight, especially from 2 to 15% by weight, based on the end product.

Accordingly, the invention relates also to a substance composition comprising a pigment {(a)+(b)} or {(a)+(b)+(c)} as defined above and (d) a high molecular weight organic material. In general, the pigment is contained in the substance composition in the form of a plurality of individual pigment particles surrounded by organic material (d).

The pigment {(a)+(b)} or {(a)+(b)+(c)} according to the invention may be contained in the substance composition according to the invention in an amount of from 0.01 to 70% by weight, based on the high molecular weight organic material (d). If the pigment according to the invention has a coating (c) consisting of a high molecular weight organic material, then that material and the high molecular weight organic material that is to be pigmented may be different or, preferably, identical. If the two high molecular weight organic materials are different, it is advisable to ensure that they are readily compatible. The person skilled in the art will know which high molecular weight organic materials are compatible with one another. In that case, it is especially preferable for the two high molecular weight organic materials to have similar refractive indices.

If the substance composition according to the invention is subjected to further processing undiluted as a pigmented high molecular weight organic material, then the amount of pigment {(a)+(b)} or {(a)+(b)+(c)} according to the invention is preferably from 0.1 to 10% by weight, based on the total weight of the substance composition according to the invention. If, by contrast, the substance composition according to the invention is used as a master batch for pigmenting another high molecular weight organic material, then the amount of pigment {(a)+(b)} or {(a)+(b)+(c)} according to the invention is preferably from 10 to 50% by weight, based on the total weight of the substance composition according to the invention.

For the pigmenting of organic materials, the effect pigments or effect pigment compositions according to the invention may be used on their own. However, it is also possible, for the purpose of achieving different shades of colour or colour effects, to add to the high molecular weight organic substances, in addition to the effect pigments or effect pigment compositions according to the invention, other colouring constituents, such as white, coloured, black or effect pigments in any desired amounts. If coloured pigments are used in admixture with the pigments or substance compositions according to the invention, then the total amount is preferably from 0.1 to 10% by weight, based on the high molecular weight organic material. The preferred combination of an effect pigment according to the invention with a coloured pigment of a complementary colour has especially high goniochromaticity, test coatings of the effect pigment and test coatings of the coloured pigment having a difference in hue ($\Delta H^*$) of from 150 to 210.

Colour values relate to the CIE $L^*a^*b^*$ ($L^*C^*H^*$) colour coordinates for normal light type D65 and CIE 1964 10°-observer ($D_{65}^{10°}$). Unless otherwise indicated, colour coordinates are values which are calculated from the reflection spectrum measured at an angle of 8° to the surface normal in the range from 300 nm to 800 nm in steps of 1 nm, for example by means of a ™Lambda 19 spectral photometer (Perkin-Elmer).

The pigmenting of the high molecular weight organic substances using the pigments or substance compositions according to the invention is carried out, for example, as follows: such a pigment or such a substance composition, if desired in the form of a master batch, is mixed with those substrates using roller mills, mixing apparatuses or grinding apparatuses. The pigmented material is then brought into the desired final form by methods known per se, such as calendering, compression moulding, extrusion, coating, casting or injection moulding. Any additives customary in the plastics industry, for example plasticisers, fillers or stabilisers, may be incorporated into the polymers in the usual amounts before or after incorporation of the pigment. In particular, in order to prepare non-rigid mouldings or to reduce their brittleness, it is desirable to incorporate plasticisers, for example esters of phosphoric acid, phthalic acid or sebacic acid, into the high molecular weight compounds before shaping.

For the pigmenting of paints and printing inks, the high molecular weight organic materials and the effect pigments or effect pigment compositions according to the invention, if desired together with customary additives, for example fillers, other pigments, siccatives or plasticisers, are finely dispersed or dissolved in a common organic solvent or solvent mixture. It is possible for the individual components to be dispersed or dissolved separately, or for several components to be dispersed or dissolved together, and only then for all the components to be combined.

When dispersing an effect pigment according to the invention in the high molecular weight organic material to be pigmented, and when processing a substance composition according to the invention, it is preferable to maintain conditions under which only relatively slight shear forces occur, so that the effect pigment is not comminuted into smaller fragments. The permissible shear force corresponds approximately to that which is permissible for the flat core (a), the gentle dispersion of which in a high molecular weight organic material is generally well known to the person skilled in the art.

The resulting colours, for example in plastics, paints or ink prints, preferably in paints or ink prints, especially in paints, are distinguished by excellent properties, especially by high saturation, high goniochromaticity and excellent colour fastness.

Accordingly, the invention relates also to the use of an effect pigment according to the invention or of an effect pigment composition according to the invention in the pigmenting of high molecular weight organic material.

If the high molecular weight material to be pigmented is a paint, then it is especially a speciality paint, especially an automotive lacquer.

The Examples which follow explain the invention.

EXAMPLE 1

A glass tube having a diameter of 2.54 cm is equipped with an external heating means, a high frequency generator (13.6 MHz) and feed lines for tetraisopropyl orthotitanate (TTIP), tetraethyl orthosilicate (TEOS) and oxygen ($O_2$). A piece of flat glass (for example microscope cover glass) is likewise placed in the tube. Under a constant, reduced pressure of 0.20 mbar and at an external temperature of 170° C., the high frequency generator is supplied with a power of 10 W so that a plasma is formed from the gases that are introduced and a coating forms on the piece of glass. The supply of TTIP, TEOS and $O_2$ is controlled as follows:

(a) TTIP and $O_2$ are introduced simultaneously into the plasma chamber each at a rate of 3 cm$^3$/s over a period of 90 seconds;

(b) over a period of 60 seconds, by turning the taps, the supply of TTIP is reduced from 3 to 0 cm$^3$/s and the supply of TEOS is simultaneously increased from 0 to 3 cm$^3$/s; the supply of oxygen remains unchanged at 3 cm$^3$/s;

(c) TEOS and $O_2$ are introduced simultaneously into the plasma chamber each at a rate of 3 cm$^3$/s over a period of 13 minutes.

Then, in succession, the supply of TEOS and $O_2$ is cut off, the high frequency generator is switched off, the apparatus is cooled to room temperature and the coated piece of glass is removed.

The coating on the piece of glass has a depth-dependent refractive index. The visual appearance of the piece of glass is yellow. At an observation angle of 8° ($D_{65}^{10°}$), a colour value of $L^*=25$, $C^*=16$ and $H^*=66$ is obtained.

EXAMPLE 2

The procedure of Example 1 is followed, but the supply of TTIP, TEOS and $O_2$ is controlled differently, as follows:

(a) TTIP and $O_2$ are introduced simultaneously into the plasma chamber each at a rate of 3 cm$^3$ls over a period of 120 seconds;

(b) over a period of 60 seconds, by turning the taps, the supply of TTIP is reduced from 3 to 0 cm$^3$/s and the supply of TEOS is simultaneously increased from 0 to 3 cm$^3$/s; the supply of oxygen remains unchanged at 3 cm$^3$/s;

(c) TEOS and $O_2$ are introduced simultaneously into the plasma chamber each at a rate of 3 cm$^3$/s over a period of 30 minutes.

The coating on the piece of glass has a depth-dependent refractive index, which is attributable to the changing composition of the coating from the inside to the outside from titanium oxide through titanium oxide/silicon oxide to silicon oxide. The visual appearance of the piece of glass is blue. At an observation angle of 8° ($D_{65}^{10°}$), a colour value of $L^*=30$, $C^*=21$ and $H^*=253$ is obtained.

EXAMPLE 3

The procedure of Example 1 is followed, but the supply of TTIP, TEOS and $O_2$ is controlled differently, as follows:

(a) TTIP and $O_2$ are introduced simultaneously into the plasma chamber each at a rate of 3 cm$^3$/s over a period of 120 seconds;

(b) over a period of 60 seconds, by turning the taps, the supply of TTIP is reduced from 3 to 0 cm$^3$/s and the supply of TEOS is simultaneously increased from 0 to 3 cm$^3$/s; the supply of oxygen remains unchanged at 3 cm$^3$/s;

(c) TEOS and $O_2$ are introduced simultaneously into the plasma chamber each at a rate of 3 cm$^3$/s over a period of 55 minutes.

The coating on the piece of glass has a depth-dependent refractive index, which is attributable to the changing composition of the coating from the inside to the outside from titanium oxide through titanium oxide/silicon oxide to silicon oxide. The visual appearance of the piece of glass is red. At an observation angle of 8° ($D_{65}^{10°}$), a colour value of $L^*=23$, $C^*=47$ and $H^*=307$ is obtained.

EXAMPLE 4

At 250° C./1 mPa, a layer of 2,9-dichloroquinacridone 230 nm thick is sublimed onto a piece of flat glass. That piece of glass serves as the substrate for the further coating instead of the transparent flat glass. Then the procedure of Example 1 is followed, but the supply of TTIP, TEOS and $O_2$ is controlled differently, as follows:

(a) TEOS and $O_2$ are introduced simultaneously into the plasma chamber each at a rate of 3 cm³/s over a period of 450 seconds;

(b) over a period of 60 seconds, by turning the taps, the supply of TEOS is reduced from 3 to 0 cm³/s and the supply of TTIP is simultaneously increased from 0 to 3 cm³/s; the supply of oxygen remains unchanged at 3 cm³/s;

(c) TTIP and $O_2$ are introduced simultaneously into the plasma chamber each at a rate of 3 cm³/s over a period of 40 minutes.

The visual appearance of the piece of glass is blue. At an observation angle of 8° ($D_{65}^{10°}$), a colour value of $L^*=26$, $C^*=23$ and $H^*=252$ is obtained.

EXAMPLE 5

In a vacuum chamber containing 3.0 mPa oxygen, a glass plate is rotated above two vapour-deposition sources consisting of $MgF_2$ in a thermally heated tungsten crucible, and of $TiO_2$ in a water-cooled copper crucible that can be bombarded with an electron gun. $MgF_2$ and $TiO_2$ are deposited simultaneously, the ratio of the two substances being achieved by the stepwise control of the amount of energy supplied. The following layers are applied in succession, the vapour deposition being uninterrupted during the transition from one layer to the next:

| | Layer thickness | Composition [% by vol.] | | Refractive index |
|---|---|---|---|---|
| glass plate | — | — | | 1.5 |
| 1st layer | 20 nm | — | $MgF_2$ 100% | 1.38 |
| 2nd layer | 43 nm | $TiO_2$ 6% | $MgF_2$ 94% | 1.43 |
| 3rd layer | 30 nm | $TiO_2$ 17% | $MgF_2$ 83% | 1.52 |
| 4th layer | 25 nm | $TiO_2$ 40% | $MgF_2$ 60% | 1.71 |
| 5th layer | 20 nm | $TiO_2$ 75% | $MgF_2$ 25% | 1.99 |
| 6th layer | 20 nm | $TiO_2$ 100% | — | 2.2 |

At observation angles of 8° and 30° ($D_{65}^{10°}$), the following colour values are obtained:

8°: $L^*=61$, $C^*=7$, $H^*=238$;

30°: $L^*=56$, $C^*=9$, $H^*=261$.

EXAMPLE 6

The procedure of Example 5 is followed, but a layer of titanium dioxide 50 nm thick is first vapour-deposited onto the glass plate. The further 6 layers are identical to those of Example 5. At observation angles of 8° and 30° ($D_{65}^{10°}$), the following colour values are obtained:

8°: $L^*=74$, $C^*=20$, $H^*=234$;

30°: $L^*=67$, $C^*=25$, $H^*=247$.

EXAMPLE 7

The procedure of Example 5 is followed, but the following layers are applied:

| | Layer thickness | Composition [% by vol.] | | Refractive index |
|---|---|---|---|---|
| glass plate | — | — | | 1.5 |
| 1st layer | 40 nm | — | $MgF_2$ 100% | 1.38 |
| 2nd layer | 43 nm | $TiO_2$ 6% | $MgF_2$ 94% | 1.43 |
| 3rd layer | 42 nm | $TiO_2$ 17% | $MgF_2$ 83% | 1.52 |
| 4th layer | 40 nm | $TiO_2$ 40% | $MgF_2$ 60% | 1.71 |
| 5th layer | 40 nm | $TiO_2$ 75% | $MgF_2$ 25% | 1.99 |
| 6th layer | 40 nm | $TiO_2$ 100% | — | 2.2 |

At observation angles of 8° and 30° ($D_{65}^{10°}$), the following colour values are obtained:

8°: $L^*=57$, $C^*=8$, $H^*=72$;

30°: $L^*=54$, $C^*=8$, $H^*=71$.

EXAMPLE 8

The procedure of Example 5 is followed, but a layer of titanium dioxide 30 nm thick is first vapour-deposited onto the glass plate. The further 6 layers are identical to those of Example 5. At observation angles of 8° and 30° ($D_{65}^{10°}$), the following colour values are obtained:

8°: $L^*=69$, $C^*=58$, $H^*=94$;

30°: $L^*=68$, $C^*=49$, $H^*=100$.

EXAMPLE 9

The procedure of Example 5 is followed, but the following layers are applied:

| | Layer thickness | Composition [% by vol.] | | Refractive index |
|---|---|---|---|---|
| glass plate | — | — | | 1.5 |
| 1st layer | 40 nm | — | $MgF_2$ 100% | 1.38 |
| 2nd layer | 42 nm | $TiO_2$ 14% | $MgF_2$ 86% | 1.5 |
| 3rd layer | 39 nm | $TiO_2$ 33% | $MgF_2$ 67% | 1.65 |
| 4th layer | 39 nm | $TiO_2$ 67% | $MgF_2$ 33% | 1.93 |
| 5th layer | 40 nm | $TiO_2$ 86% | $MgF_2$ 14% | 2.09 |
| 6th layer | 20 nm | $TiO_2$ 100% | — | 2.2 |

At observation angles of 8° and 30° ($D_{65}^{10°}$), the following colour values are obtained:

8°: $L^*=42$, $C^*=21$, $H^*=295$;

30°: $L^*=38$, $C^*=22$, $H^*=308$.

EXAMPLE 10

The procedure of Example 7 is followed, but a layer of titanium dioxide 30 nm thick is first vapour-deposited onto the glass plate. The further 6 layers are identical to those of Example 7. At observation angles of 8° and 30° ($D_{65}^{10°}$), the following colour values are obtained:

8°: $L^*=43$, $C^*=64$, $H^*=325$;

30°: $L^*=44$, $C^*=47$, $H^*=335$.

EXAMPLE 11

The procedure of Example 5 is followed, but the following layers are applied:

| | Layer thickness | Composition [% by vol.] | | Refractive index |
|---|---|---|---|---|
| glass plate | — | — | | 1.5 |
| 1st layer | 60 nm | — | $MgF_2$ 100% | 1.38 |
| 2nd layer | 63 nm | $TiO_2$ 14% | $MgF_2$ 86% | 1.5 |
| 3rd layer | 57 nm | $TiO_2$ 33% | $MgF_2$ 67% | 1.65 |
| 4th layer | 55 nm | $TiO_2$ 67% | $MgF_2$ 33% | 1.93 |
| 5th layer | 59 nm | $TiO_2$ 86% | $MgF_2$ 14% | 2.09 |
| 6th layer | 60 nm | $TiO_2$ 100% | — | 2.2 |

At observation angles of 8° and 30° ($D_{65}^{10°}$), the following colour values are obtained:

8°: $L^*=51$, $C^*=10$, $H^*=174$;

30°: $L^*=46$, $C^*=11$, $H^*=200$.

EXAMPLE 12

The procedure of Example 7 is followed, but a layer of titanium dioxide 30 nm thick is first vapour-deposited onto the glass plate. The further 6 layers are identical to those of Example 7. At various observation angles from 8° to 60° ($D_{65}^{10°}$), the following colour values are obtained:

8°: $L^*=64$, $C^*=53$, $H^*=150$;

15°: $L^*=64$, $C^*=53$, $H^*=149$;

30°: $L^*=58$, $C^*=50$, $H^*=169$;

45°: $L^*=47$, $C^*=41$, $H^*=205$;

60°: $L^*=36$, $C^*=31$, $H^*=269$.

EXAMPLE 13

The procedure of Example 5 is followed, but the following layers are applied:

| | Layer thickness | Composition [% by vol.] | | Refractive index |
|---|---|---|---|---|
| glass plate | — | — | | 1.5 |
| 1st layer | 50 nm | Al | | |
| 2nd layer | 30 nm | $TiO_2$ | | 2.2 |
| 3rd layer | 60 nm | — | $MgF_2$ 100% | 1.38 |
| 4th layer | 63 nm | $TiO_2$ 14% | $MgF_2$ 86% | 1.5 |
| 5th layer | 57 nm | $TiO_2$ 33% | $MgF_2$ 67% | 1.65 |
| 6th layer | 57 nm | $TiO_2$ 67% | $MgF_2$ 33% | 1.93 |
| 7th layer | 62 nm | $TiO_2$ 86% | $MgF_2$ 14% | 2.09 |
| 8th layer | 20 nm | $TiO_2$ 100% | — | 2.2 |

At observation angles of 8° and 30° ($D_{65}^{10°}$), the following colour values are obtained:

8°: $L^*=94$, $C^*=14$, $H^*=73$;

30°: $L^*=95$, $C^*=24$, $H^*=107$.

EXAMPLE 14

The procedure of Example 5 is followed, but the following layers are applied:

| | Layer thickness | Composition [% by vol.] | | Refractive index |
|---|---|---|---|---|
| glass plate | — | — | | 1.5 |
| 1st layer | 50 nm | Ti | | |
| 2nd layer | 30 nm | $TiO_2$ | | 2.2 |
| 3rd layer | 20 nm | — | $MgF_2$ 100% | 1.38 |
| 4th layer | 42 nm | $TiO_2$ 6% | $MgF_2$ 94% | 1.43 |
| 5th layer | 42 nm | $TiO_2$ 17% | $MgF_2$ 83% | 1.52 |
| 6th layer | 42 nm | $TiO_2$ 40% | $MgF_2$ 60% | 1.71 |

| | Layer thickness | Composition [% by vol.] | | Refractive index |
|---|---|---|---|---|
| 7th layer | 41 nm | $TiO_2$ 75% | $MgF_2$ 25% | 1.99 |
| 8th layer | 20 nm | $TiO_2$ 100% | — | 2.2 |

At an observation angle of 8°, the following colour value is obtained:

$L^*=66$, $C^*=40$ and $H^*=15$.

EXAMPLE 15

The procedure of Example 5 is followed, but instead of the glass plate there is used as the target material a 10×30 cm piece of cellulose acetate film 74 μm thick (AC311075, Goodfellow Inc.). The following layers are applied thereto:

| | Layer thickness | Composition [% by vol.] | | Refractive index |
|---|---|---|---|---|
| cellulose acetate | — | — | | — |
| 1st layer | 40 nm | $TiO_2$ 100% | — | 2.2 |
| 2nd layer | 40 nm | $TiO_2$ 75% | $MgF_2$ 25% | 1.99 |
| 3rd layer | 40 nm | $TiO_2$ 40% | $MgF_2$ 60% | 1.71 |
| 4th layer | 42 nm | $TiO_2$ 17% | $MgF_2$ 83% | 1.52 |
| 5th layer | 43 nm | $TiO_2$ 6% | $MgF_2$ 94% | 1.43 |
| 6th layer | 40 nm | — | $MgF_2$ 100% | 1.38 |
| 7th layer | 80 nm | $TiO_2$ 100% | — | 2.2 |
| 8th layer | 40 nm | — | $MgF_2$ 100% | 1.38 |
| 9th layer | 43 nm | $TiO_2$ 6% | $MgF_2$ 94% | 1.43 |
| 10th layer | 42 nm | $TiO_2$ 17% | $MgF_2$ 83% | 1.52 |
| 11th layer | 40 nm | $TiO_2$ 40% | $MgF_2$ 60% | 1.71 |
| 12th layer | 40 nm | $TiO_2$ 75% | $MgF_2$ 25% | 1.99 |
| 13th layer | 40 nm | $TiO_2$ 100% | — | 2.2 |

The film is then treated at room temperature in a water-filled ultrasound bath until the cellulose acetate has dissolved completely. The resulting suspension is filtered, washed with water and dried to yield a yellow pigment powder which consists of a $TiO_2$ core 80 nm thick with a coating on both sides analogous to Example 7.

EXAMPLES 16–22

The procedure is analogous to Example 15 as regards the principle and analogous to Examples 1–5, 9 and 11 as regards the building up of the layers, but layers 6 to 1 and 8 to 13 of Example 15 are replaced, in each case symmetrically around the core, by coatings analogous to Examples 1–5, 9 and 11.

EXAMPLES 23–28

The procedure is analogous to Example 15 as regards the principle and analogous to Examples 6, 8, 10, 12, 13 and 14 as regards the building up of the layers, but layers 6 to 1 and 8 to 13 of Example 15 are replaced, in each case symmetrically around the inner core, by coatings analogous to layers 2–7 of Examples 6, 8, 10 and 12, and analogous to layers 2–8 of Examples 13 and 14, respectively, and layer 7 of Example 15 is replaced by the first layer of Examples 6, 8, 10, 12, 13 and 14, respectively.

EXAMPLE 29

The following paint components are dispersed together in a dispersing device (®Dispermat) over a period of 60 minutes at 1500 revs/min:

1.0 g of the pigment obtained according to Example 15;

13.4 g of CAB solution comprising 41.0 parts by weight of 20% cellulose acetobutyrate in butanol/xylene 2:1 (®CAB 531.1, Eastman Chem.)

1.5 parts by weight of zirconium octoate, 18.5 parts by weight of ®Solvesso 150* (ESSO), 21.5 parts by weight of butyl acetate and 17.5 parts by weight of xylene;

5.0 g of polyester resin (®Dynapol H700, Dynamit Nobel); and 0.6 g of melamine resin (®Maprenal MF 650, Hoechst).

The resulting paint is applied to a suitable substrate (black/white striped cardboard, Leneta Co.) by means of a film applicator (wet film thickness 100 μm), and after an evaporation time of 30 minutes at room temperature is baked at 130° C. for 30 minutes.

A yellow, brilliant colouring having a goniochromatic effect and excellent light and weather resistance is obtained.

What is claimed is:

1. A pigment comprising
   (a) a flat core and
   (b) at least one coating consisting of at least two different substances that is applied to the surface of the core, wherein
      the coating (b) has a substantially continuously variable composition in the axis lying perpendicular to its surface, and
      the refractive indices of the coating (b) at the surface facing the core (a) and at the surface remote from the core (a) are different.

2. A pigment according to claim 1, comprising
   (a) a flat core,
   (b) at least one coating consisting of at least two different substances that is applied to the surface of the core, and
   (c) an outer coating applied to the coating (b), wherein
      the coating (b) has a substantially continuously variable composition in the axis lying perpendicular to its surface, and
      the refractive indices of the coating (b) at the surface facing the core (a) and at the surface remote from the core (a) are different.

3. A pigment according to claim 1, wherein the difference in refractive index between the surface of the core and the core-facing surface of the coating (b) consisting of at least two different substances is at least 0.05.

4. A pigment according to claim 1, wherein the coating (b) comprises at least two substances selected from the group consisting of $TiO_2$, $ZrO_2$, $SiO$, $SiO_2$, $SnO_2$, $GeO_2$, $ZnO$, $Al_2O_3$, $V_2O_5$, $Fe_2O_3$, $Cr_2O_3$, $MgO$, $MgF_2$, $CuO$ and $PbTiO_3$.

5. A pigment according to claim 1, wherein the core consists of a reflective metal flake, a coloured metallic-effect pigment, a flat organic pigment particle or a mineral platelet.

6. A pigment according to claim 5, wherein the mineral platelet is a mica particle.

7. A pigment according to claim 1, wherein the core is plate-shaped and has a length of from 3 to 200 μm, a width of from 3 to 200 μm and a thickness of from 0.1 to 5 μm.

8. A pigment according to claim 1, wherein the surface of the core consists of a coloured pigment and has a refractive index of from 1.20 to 1.80 at 800 nm.

9. A pigment according to claim 8, wherein the absolute difference between the refractive index of the surface of the core at 400 nm and the refractive index of the surface of the coating (b) applied to the core that faces the core is from 0.00 to 0.50.

10. A pigment according to claim 1, wherein the coating (b) has a layer thickness of from 60 to 1000 nm.

11. A composition comprising a pigment according to claim 1 and (d) a high molecular weight organic material.

12. A composition according to claim 11, wherein the difference in refractive index between the side of the coating (b) that is remote from the core (a) and the organic material (d) surrounding the pigment according to the invention is at least 0.20.

13. A composition according to claim 12, wherein both the difference in refractive index between the surface of the coating (b) that is remote from the core (a) and the high molecular weight organic material (d), and the difference in refractive index between the surface of the coating (b) that faces the core (a) and the surface of the core, have absolute values of from 0.30 to 1.50.

14. A composition according to claim 11, wherein the high molecular weight organic material is an organic polymer obtainable by polymerisation, polycondensation or polyaddition.

15. A composition according to claim 11, wherein the pigment is present in an amount of from 0.01 to 70% by weight, based on the high molecular weight organic material (d).

16. A composition according to claim 11, wherein the high molecular weight organic material is a paint or a printing ink.

17. A composition according to claim 16, wherein the high molecular weight organic material is an automotive lacquer.

18. A process for the preparation of a pigment according to claim 1 by coating a flat core with a coating that consists of at least two different substances and the composition of which is variable in the axis lying perpendicular to the surface, wherein the relative concentration of the starting materials required to form the coating is changed in the course of the coating operation.

19. A process according to claim 18, wherein the coating is produced by cathodic sputtering or chemical vapour deposition, and the flat core to be coated is conveyed along a linear or circular route past at least two vapour sources, the emergent gas mixtures of which have different substance compositions.

20. A high molecular weight organic material containing an effective pigmenting amount of a pigment according to claim 1.

21. A high molecular weight organic material containing an effective pigmenting amount of a composition according to claim 11.

* * * * *

UNITED STATES PATENT AND TRADEMARK OFFICE
CERTIFICATE OF CORRECTION

PATENT NO. : 5,855,660

DATED : JANUARY 5, 1999

INVENTOR(S) : PATRICE BUJARD ET AL.

It is certified that error appears in the above-identified patent and that said Letters Patent is hereby corrected as shown below:

```
On the title page, please insert :
Section [75] should read :
```

-- [75] Inventors: Patrice Bujard, Kennett Square, Pa.;

Natacha Bonnard, Cheyres, Switzerland;

Ryuichi Takahashi, Hyogo, Japan --.

Signed and Sealed this

Eleventh Day of May, 1999

Q. TODD DICKINSON

*Attest:*

*Attesting Officer*      *Acting Commissioner of Patents and Trademarks*